US012568089B2

(12) United States Patent
　　　Funayama

(10) Patent No.: US 12,568,089 B2
(45) Date of Patent: Mar. 3, 2026

(54) SYSTEM, METHOD, AND STORAGE MEDIUM FOR MANAGING ANCHOR INFORMATION

(71) Applicant: CANON KABUSHIKI KAISHA, Tokyo (JP)

(72) Inventor: Hirotaka Funayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 18/177,476

(22) Filed: Mar. 2, 2023

(65) Prior Publication Data

US 2023/0319051 A1　　Oct. 5, 2023

(30) Foreign Application Priority Data

Mar. 7, 2022　(JP) ................................. 2022-034047

(51) Int. Cl.
　　*H04L 9/40*　　　　(2022.01)
　　*H04L 67/131*　　　(2022.01)
(52) U.S. Cl.
　　CPC .......... *H04L 63/104* (2013.01); *H04L 67/131* (2022.05)
(58) Field of Classification Search
　　CPC .......................... H04L 63/104; H04L 67/131
　　See application file for complete search history.

(56) References Cited

U.S. PATENT DOCUMENTS

| | | | |
|---|---|---|---|
| 9,818,228 B2 * | 11/2017 | Lanier | ................... H04W 12/06 |
| 2013/0042296 A1 * | 2/2013 | Hastings | .............. G06Q 50/184 |
| | | | 726/1 |
| 2014/0368537 A1 | 12/2014 | Salter et al. | |
| 2019/0108558 A1 | 4/2019 | Spivack et al. | |
| 2020/0066042 A1 * | 2/2020 | Marsh | ................... G06T 19/006 |
| 2022/0114792 A1 * | 4/2022 | Kawamae | .............. G06F 3/011 |
| 2022/0230434 A1 * | 7/2022 | Ju | ...................... G06Q 20/0855 |

FOREIGN PATENT DOCUMENTS

| | | |
|---|---|---|
| JP | 2012168646 A | 9/2012 |
| JP | 2015118578 A | 6/2015 |

* cited by examiner

*Primary Examiner* — Boris D Grijalva Lobos
(74) *Attorney, Agent, or Firm* — Canon U.S.A., Inc. IP Division

(57)　　　ABSTRACT

A system manages, in a case where feature quantities in a real world is managed in association with identification information, the feature quantities in the real world being used to link the virtual object with the real world to display the virtual object, a permission setting of use for the virtual object associated with the identification information are further managed.

10 Claims, 12 Drawing Sheets

*121*

VIRTUAL OBJECT MANAGEMENT SYSTEM

*311*
ANCHOR MANAGEMENT UNIT

*312*
ANCHOR RECEPTION UNIT

*313*
ANCHOR PROVISION UNIT

*314*
USER MANAGEMENT UNIT

*315*
LOGIN PROCESSING UNIT

*131-133*

CLIENT TERMINALS

*306*
LOCAL ANCHOR MANAGEMENT UNIT

*301*
VIRTUAL OBJECT DATA MANAGEMENT UNIT

*302*
ANCHOR GENERATION UNIT

*303*
ANCHOR ACQUISITION UNIT

*304*
ANCHOR DRAWING UNIT

*305*
LOGIN UNIT

FIG.6A

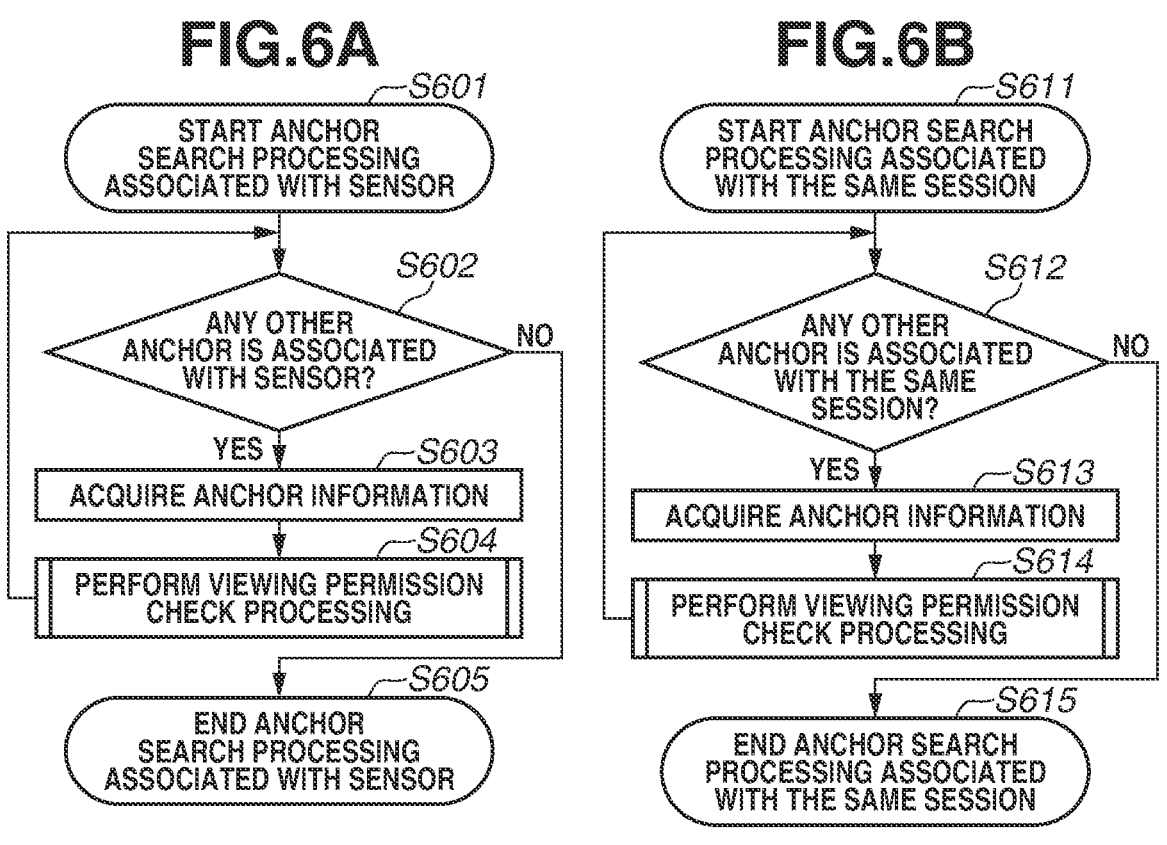

*S601*
START ANCHOR
SEARCH PROCESSING
ASSOCIATED WITH SENSOR

*S602*
ANY OTHER
ANCHOR IS ASSOCIATED
WITH SENSOR?
NO

YES *S603*
ACQUIRE ANCHOR INFORMATION

*S604*
PERFORM VIEWING PERMISSION
CHECK PROCESSING

*S605*
END ANCHOR
SEARCH PROCESSING
ASSOCIATED WITH SENSOR

FIG.6B

*S611*
START ANCHOR SEARCH
PROCESSING ASSOCIATED
WITH THE SAME SESSION

*S612*
ANY OTHER
ANCHOR IS ASSOCIATED
WITH THE SAME
SESSION?
NO

YES *S613*
ACQUIRE ANCHOR INFORMATION

*S614*
PERFORM VIEWING PERMISSION
CHECK PROCESSING

*S615*
END ANCHOR SEARCH
PROCESSING ASSOCIATED
WITH THE SAME SESSION

FIG.6C

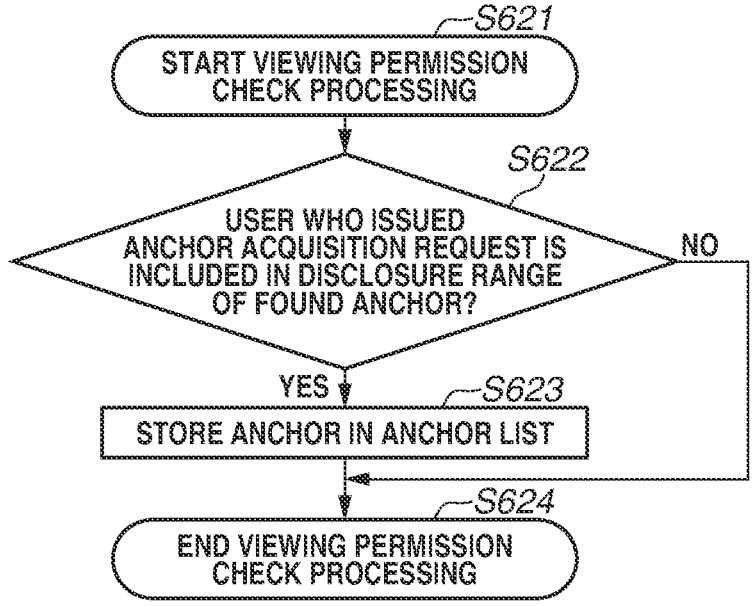

*S621*
START VIEWING PERMISSION
CHECK PROCESSING

*S622*
USER WHO ISSUED
ANCHOR ACQUISITION REQUEST IS
INCLUDED IN DISCLOSURE RANGE
OF FOUND ANCHOR?
NO

YES *S623*
STORE ANCHOR IN ANCHOR LIST

*S624*
END VIEWING PERMISSION
CHECK PROCESSING

SYSTEM, METHOD, AND STORAGE MEDIUM FOR MANAGING ANCHOR INFORMATION

BACKGROUND OF THE INVENTION

Field of the Invention

The present invention relates to a technique for managing a virtual object to be used for, for example, a technique of augmented reality (AR) and the like.

Description of the Related Art

Extended reality (XR) as a generic term of techniques for generating a space for providing a simulated experience has attracted attention. Examples of such techniques include virtual reality (VR) and augmented reality (AR) for blending a virtual world into the real world. Various standardization activities for XR are currently being performed. In recent years, mechanisms for displaying a virtual object on a plurality of terminals at the same place in the real world have been implemented on platforms provided by various manufacturers. Examples of the implementation include a management system that associates a virtual object to be placed in the real world with feature quantities in the real world captured by a camera. When a user captures the real world that coincides with feature quantities managed by the system by using the camera of a certain terminal, the user can view the virtual object managed in association with the feature quantities on the certain terminal.

Japanese Patent Application Laid-Open No. 2015-118578 discusses a technique for changing a display mode of a specific virtual object by using user behavioral information and physical environmental information. An example of the display mode changing is performed in such a manner that a virtual object of a simple blue globe is initially displayed, and as the user approaches or gazes the virtual object, the display changes to detailed land features.

A user who places a virtual object that can be displayed on a plurality of terminals in the real world may want to set various permissions, such as a disclosure range to the virtual object, depending on an application of the virtual object.

Since the technique discussed in Japanese Patent Application Laid-Open No. 2015-118578 changes a display mode of the virtual object in accordance with user behavioral information and physical environmental information, it is difficult to perform such control that allows only users intended by a user who has placed a virtual object to be able to view the virtual object.

SUMMARY OF THE INVENTION

The present invention is directed to providing a mechanism for reflecting permissions to be set to a virtual object in a case where the virtual object is disclosed in association with feature quantities in the real world.

According to an aspect of the present invention, a system for managing a virtual object, the system comprising a management unit configured to manage feature quantities in a real world in association with identification information, the feature quantities in the real world being used to link the virtual object with the real world to display the virtual object wherein the management unit further manages the identification information and a permission setting of use for the virtual object associated with the identification information.

Further features of the present invention will become apparent from the following description of exemplary embodiments with reference to the attached drawings.

BRIEF DESCRIPTION OF THE DRAWINGS

FIGS. 6A and 6B are flowcharts illustrating anchor search processing and FIG. 6C is a flowchart illustrating viewing permission check processing which are performed by the virtual object managing system according to the first exemplary embodiment.

DESCRIPTION OF THE EMBODIMENTS

A best mode for embodying the present invention will be described below with reference to the accompanying drawings.

Figure 1:
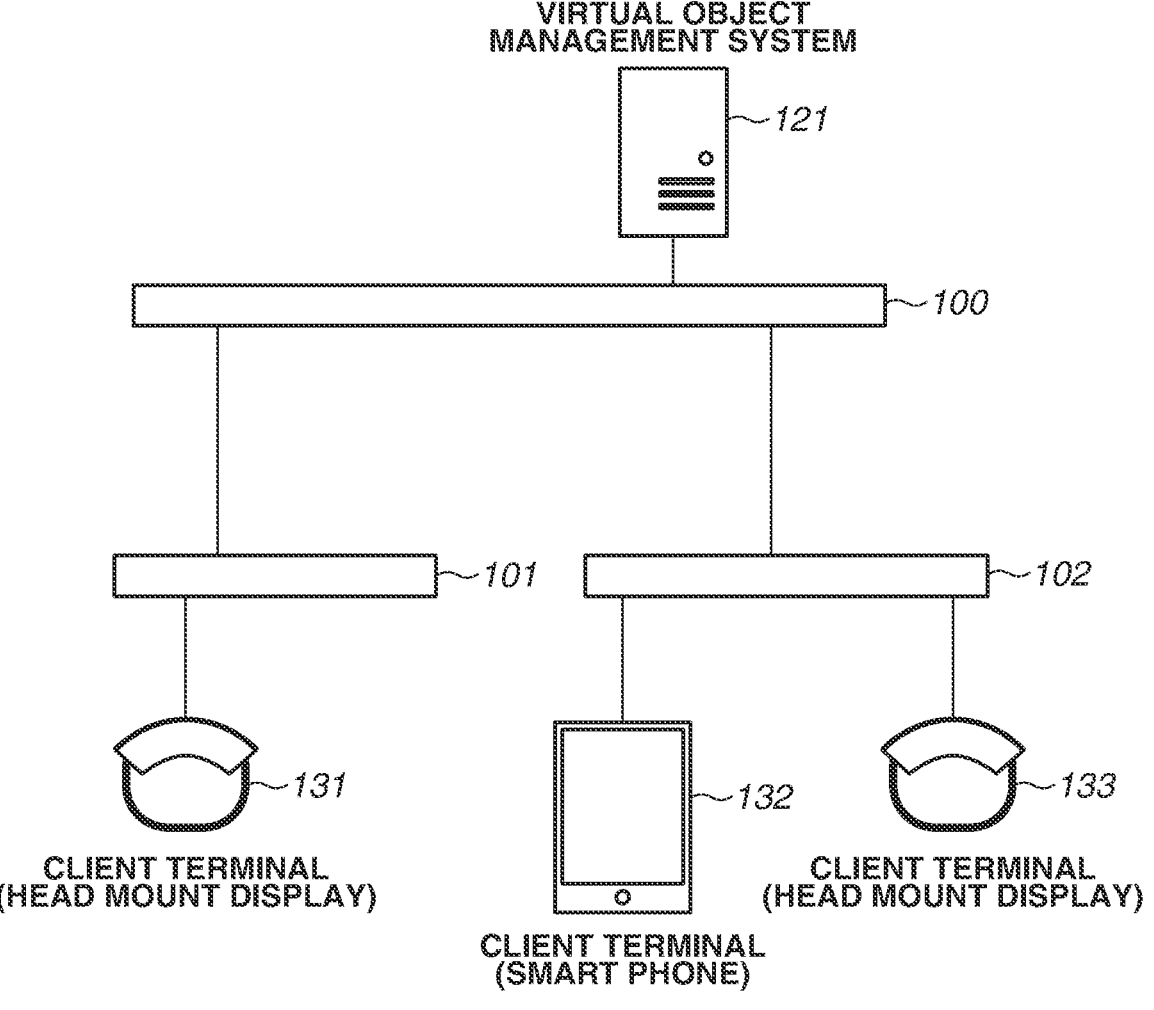
FIG. 1 is a diagram illustrating an overall configuration according to a first exemplary embodiment.

FIG. 1 is a diagram illustrating an overall configuration according to a first exemplary embodiment of the present invention.

Referring to FIG. 1, a virtual object management system 121 is connected with client terminals 131 to 133 via networks 100 to 102. Each of the networks 100 to 102 is, for example, a communication network implemented by the Internet, a Local Area Network (LAN), Wide Area Network (WAN), telephone line, dedicated digital line, Asynchronous Transfer Mode (ATM), frame relay circuit, cable television circuit, and wireless circuit for data broadcasting. The networks 100 to 102 may be any communication network as long as data transmission and reception can be performed. In the present invention, the network 100 is the Internet, and the networks 101 and 102 are the Internet, a home or corporate network, and a wireless LAN in town, for example.

Examples of the client terminals 131 to 133 include head-mounted displays (HMDs), smart glasses and other dedicated hardware components supporting virtual object drawing in XR, and smart phones and other portable devices incorporating a program execution environment. Each of the client terminals 131 to 133 includes a camera for capturing an image of the surrounding area and a display for displaying a virtual object. Each of the client terminals 131 to 133 captures an image of the surrounding area using the camera, superimposes the virtual object on the captured real world image, and projects the superimposed image on the display, whereby the user can have a simulated experience in a blended form of the real world and a virtual world. In a case where the client terminals 131 to 133 are non-dedicated hardware components, such as smart phones, the client terminals 131 to 133 draw the virtual object by using Application Program Interfaces (APIs) provided by a web browser or an operating system (OS).

The virtual object management system 121 provides a service that associates a virtual object to be placed in the real world with feature quantities in the real world captured by a camera, and a service that provides external terminals with the virtual object.

The virtual object management system 121 is built by using a server computer, and can also be built by using cloud computing techniques. In the present exemplary embodiment, association information that is managed by virtual object management system 121 and is used to associate a virtual object with feature quantities in the real world captured by a camera is hereinafter referred to as an anchor. The association information includes, in addition to the above-described information, information, such as property information including an identifier for identifying the anchor itself, a session identifier (ID), and various parameters (described below).

The virtual object management system 121 receives an anchor registration request from the client terminals 131 to 133 and manages registered anchors. The virtual object management system 121 also receives an anchor acquisition request from the client terminals 131 to 133 and returns an anchor that satisfies a requested condition from among the managed anchors.

The virtual object management system 121 also manages users using the client terminals 131 to 133. More specifically, the virtual object management system 121 receives a login/logout request from the client terminals 131 to 133 and performs login/logout processing.

In the present exemplary embodiment, server functions according to the present invention may be implemented by a single server, a single virtual server, a plurality of servers, or a plurality of virtual servers. Alternatively, a plurality of virtual servers may be implemented on a single server.

Figure 2:
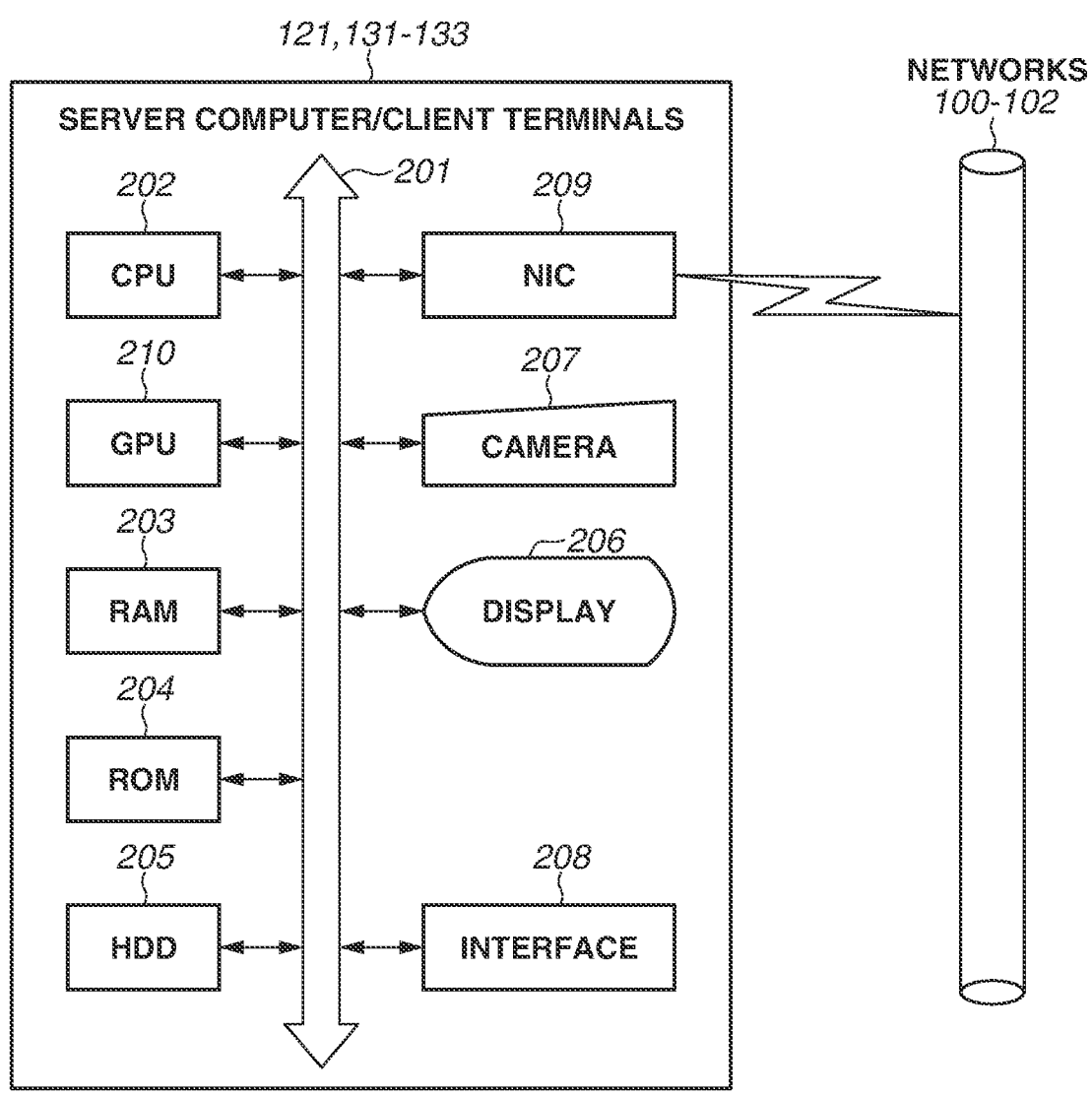
FIG. 2 is a diagram illustrating a hardware configuration of a server computer for the virtual object managing system and a client terminal according to the first exemplary embodiment.

FIG. 2 illustrates a hardware configuration of the virtual object management system 121 and the client terminals 131 to 133 according to exemplary embodiments of the present invention.

Referring to FIG. 2, a central processing unit (CPU) 202 controls the entire operation of corresponding one of the system or the terminals. The CPU 202 executes application programs and the OS stored in a hard disc drive (HDD) 205 and temporarily stores information and files for program execution in a random access memory (RAM) 203. A graphics processing unit (GPU) 210 performs calculation processing for drawing of a virtual object in real time. A read only memory (ROM) 204 is a storage unit for storing the basic Input/Output (I/O) programs and other various data. The RAM 203 is a temporary storage unit that functions as main memories of the CPU 202 and GPU 210 and as a work area. The HDD 205 is an external storage device that functions as a mass storage for storing application programs such as a web browser, programs of a service server group, the OS, and other related programs. A display 206 is a display unit for displaying information to be used in an operation of a virtual object. An interface 208 is an external apparatus interface (I/F) for connecting a peripheral apparatus, such as an external sensor.

A camera 207 is an out-camera for capturing an image of the surrounding area or an in-camera for capturing mainly an image of the user on the client terminals 131 to 133. An image captured by the camera 207, especially an out-camera, is analyzed by using an application program stored in the HDD 205, whereby a virtual object can be superimposed on the real world to place the virtual object in the real world and feature quantities in the real world can be calculated. When the client terminals 131 to 133 are XR-dedicated terminals, such as HMDs, the virtual object displayed on the display 206 can be operated by user's fingers recognized by the camera 207. On the other hand, when the client terminals 131 to 133 are non-XR-dedicated terminals, such as smart phones, the touch panel of the display 206 is operated to operate the virtual object displayed on the display 206. The virtual object management system 121 does not necessarily require the camera 207.

A system bus 201 controls data flows in the apparatus. A network interface card (NIC) 209 is an interface that exchanges data with an external apparatus via the networks 100 to 102. The above-described computer configuration is not limited to an example configuration in FIG. 2. For example, locations where data and programs are stored can be changed to the ROM 204, RAM 203, and HDD 205 according to the features. When the CPU 202 and GPU 210 execute processing based on programs stored in the HDD 205, the processing in the software configuration illustrated in FIG. 3 is implemented.

The software configuration according to the present exemplary embodiment will be described below with reference to FIGS. 3, 4, 5, 6A to 6C, 7, 8, 9, and 10A and 10B.

Figure 3:
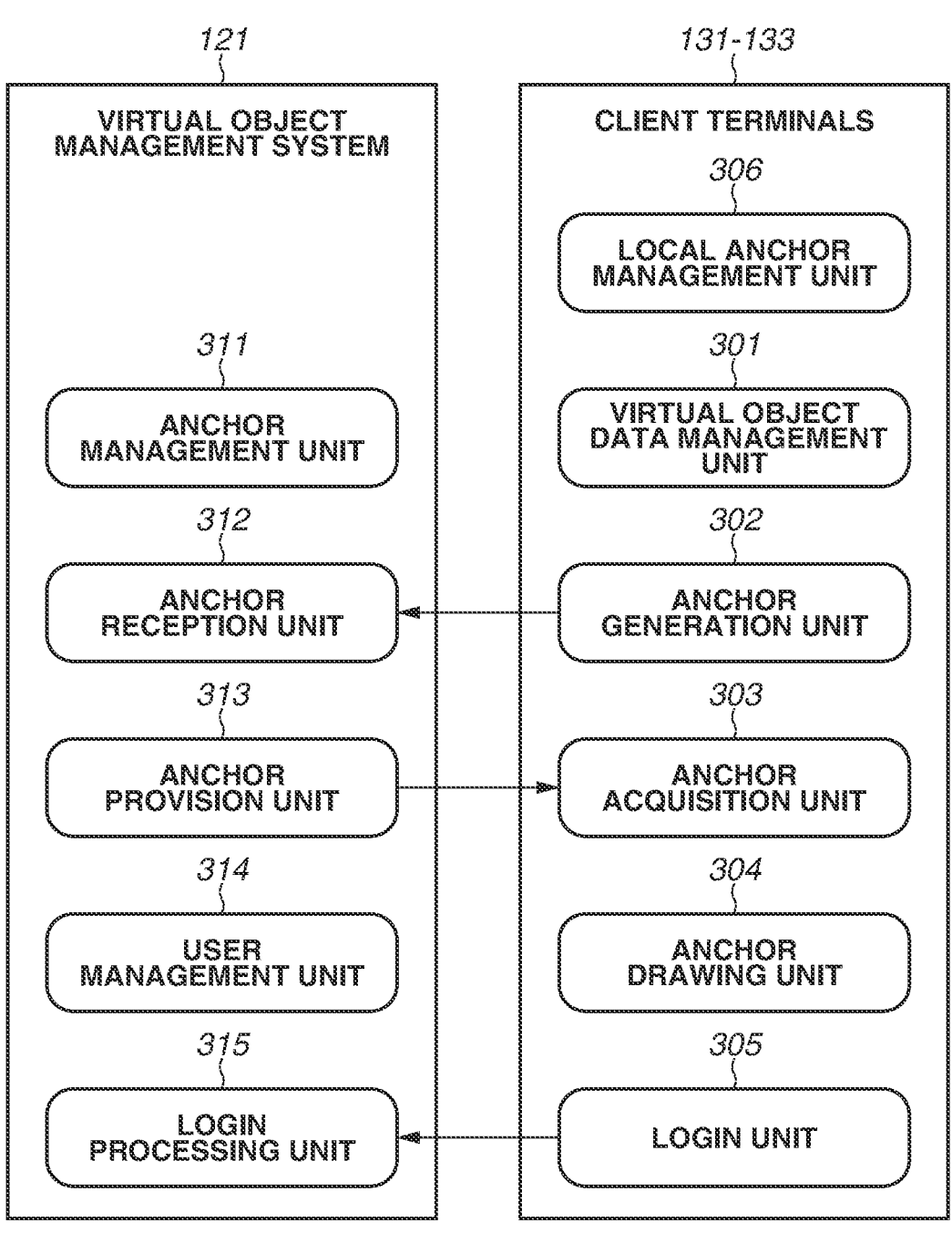
FIG. 3 is a diagram illustrating a software configuration according to the first exemplary embodiment.

FIG. 3 illustrates the software configuration of extracted functions related to the present exemplary embodiment.

The virtual object management system 121 includes an anchor management unit 311, an anchor reception unit 312, an anchor provision unit 313, a user management unit 314, and a login processing unit 315.

The login processing unit 315 receives a login request from the client terminals 131 to 133, compares the request with information held in the user management unit 314, and returns a login processing result to the client terminals 131 to 133. Table A illustrates examples of data items managed by the user management unit 314.

TABLE A

| User ID | Password | Belonging Groups |
|---|---|---|
| userW | ********* | T, S |
| user X | ********* | S |
| userY | ********* | S |
| userZ | ********* | S |
| : | : | : |

A "User ID" column indicates IDs for uniquely identifying users from each user. A "Password" column indicates basic authentication passwords each of which is used when the corresponding user logs in the system. The login processing unit 315 searches Table A for a combination of a user ID and a password included in the login request from the client terminals 131 to 133. In a case where the combination coincides with the data in Table A, the login processing unit 315 determines that the login processing is successful and returns the result to the client terminals 131 to 133. A "Belonging Groups" column describes pieces of information about groups to each of which the user uniquely identified by the "User ID" column belongs, in the comma separated value (CSV) format. For example, a user indicated as userW in the "User ID" column belongs to two different groups T and S, and a user indicated as userY in the "User ID" column belongs to no group since the "Belonging Groups" column is a blank.

When the anchor reception unit 312 receives an anchor registration request from the client terminals 131 to 133, the anchor reception unit 312 stores the received anchor information in the anchor management unit 311. In response to receipt of an anchor acquisition request from the client terminals 131 to 133, the anchor provision unit 313 searches for an anchor satisfying a condition indicated in the request from the anchor management unit 311 and returns the anchor to the client terminals 131 to 133.

Table B illustrates examples of data items managed by the anchor management unit 311.

(3) the "Sensor Information" column indicates location information (Global Positioning System (GPS) coordinates) for the location where the anchor is placed, a beacon ID or a Wi-Fi ID associated with the anchor, and the like.

In the present invention, feature quantities indicated as an anchor are managed based on three pieces of information stored in (1) "Feature Quantity" column, (2) "Position Information" column, and (3) "Sensor Information" column in Table B. The management of the feature quantities of each anchor can be implemented by using at least one of these pieces of information, or a combination of a plurality of pieces of information and a combination with other information.

The anchor provision unit 313 returns an anchor associated with a specific anchor ID in response to an anchor acquisition request from the client terminals 131 to 133. The anchor provision unit 313 also returns a plurality of anchors associated with the same session ID or the same sensor ID. The "Owner" column indicates user IDs of users who

TABLE B

| Anchor ID | Session ID | Virtual Object Data | Feature Quantity | Position Information | Sensor Information | Owner | Disclosure Range | Storage Permission Range |
|---|---|---|---|---|---|---|---|---|
| a | 111 | aaa.obj | xxx.dat | (1, 23, 31) | Beacon: 123 | userX | Public | Public |
| b | 222 | bbb.obj | yyy.dat | (1, 3, 22) | Beacon: 123 | userX | Group S | Group S |
| c | 333 | ccc.obj | zzz.dat | (25, 3, 41) | Wi-Fi: 345 | userY | Group S | Private |
| d | 111 | ddd.obj | aaa.dat | (10, 10, 1) | Wi-Fi: 345 | userX | Public | Group T |
| . | . | . | . | | . | . | . | . |
| . | . | . | . | | . | . | . | . |

When the anchor reception unit 312 receives an anchor registration request from the client terminals 131 to 133, the anchor reception unit 312 stores a record of the corresponding anchor in the anchor management unit 311.

The "Anchor ID" column indicates unique IDs (identification information) for identifying anchors from each other. The "Anchor ID" is assigned by the anchor reception unit 312 when the anchor reception unit 312 stores a record in Table B. In the "Session ID" column, the same ID is assigned to anchors of the same session. Associating a plurality of anchors with one session ID enables presenting a plurality of anchors having the same session ID to the user at the same time. The "Virtual Object Data" column indicates three-dimensional (3D) model data in an optional format.

In the present invention, feature quantities for associating a virtual object indicated by an anchor with the real world are managed based on three different pieces of information stored in (1) "Feature Quantity" column, (2) "Position Information" column, and (3) "Sensor Information" column in Table B. The details of each columns are as follows:

(1) the "Feature Quantity" column indicates the three-dimensional feature quantity in the real world acquired by analyzing data (including two- and three-dimensional images) of the surrounding area of the anchor captured by the camera 207, (2) the "Position Information" column indicates the three-dimensional position of a virtual object in the real world, and generated a corresponding anchor, and stores any one value of the "User ID" column in Table A. The "Disclosure Range" column indicates disclosure ranges of respective anchor. For example, the user who generated an anchor selects one of three different levels from among public (disclosed to all users), conditionally public (disclosed to users belonging to group S), and private (disclosed to none of users). The anchor acquisition request from the client terminals 131 to 133 includes information about the login user, such as the user ID. The anchor provision unit 313 returns only an anchor(s) of which the disclosure range includes the login user included in the anchor acquisition request, to the client terminals 131 to 133. The "Storage Permission Range" column indicates ranges of users permitted to locally store the 3D model data stored in the "Virtual Object Data" column. Once locally storing the 3D model data in the "Virtual Object Data" column, i.e., locally storing the 3D model data in a virtual object data management unit 301, is performed, the permitted users can register the 3D model data in the "Virtual Object Data" column to a different location in association with a different anchor. Similar to the case of the "Disclosure Range" column, the user who generated an anchor selects one of three different levels for the "Storage Permission Range" column from among public (disclosed to all users), conditionally public (disclosed to users belonging to group S), and private (disclosed to none of users). In the present exemplary embodiment, the anchor provision unit 313 performs comparison to determine whether the login user included in the anchor acquisition request from the client terminals 131 to 133 is included in the disclosure range. However, this comparison may be performed by an anchor acquisition unit 303 (described below) of the client terminals 131 to 133.

Each of the client terminals 131 to 133 includes the virtual object data management unit 301, an anchor generation unit 302, the anchor acquisition unit 303, an anchor drawing unit 304, a login unit 305, and a local anchor management unit 306.

The login unit 305 transmits the user name and password input by an operation with the fingers captured by the camera 207, an operation on the touch panel of the display 206, or an operation on the keyboard connected to the interface 208, to the login processing unit 315. Applicable authentication methods for the virtual object management system 121 include the face recognition using a face image captured by the camera 207, the iris authentication using the iris, and the fingerprint authentications using a fingerprint sensor connected to the interface 208.

The virtual object data management unit 301 stores 3D model data in various formats. The 3D model data stored in the virtual object data management unit 301 is a virtual object that can be freely superimposed on and placed in the real world by the user.

Figure 10A:
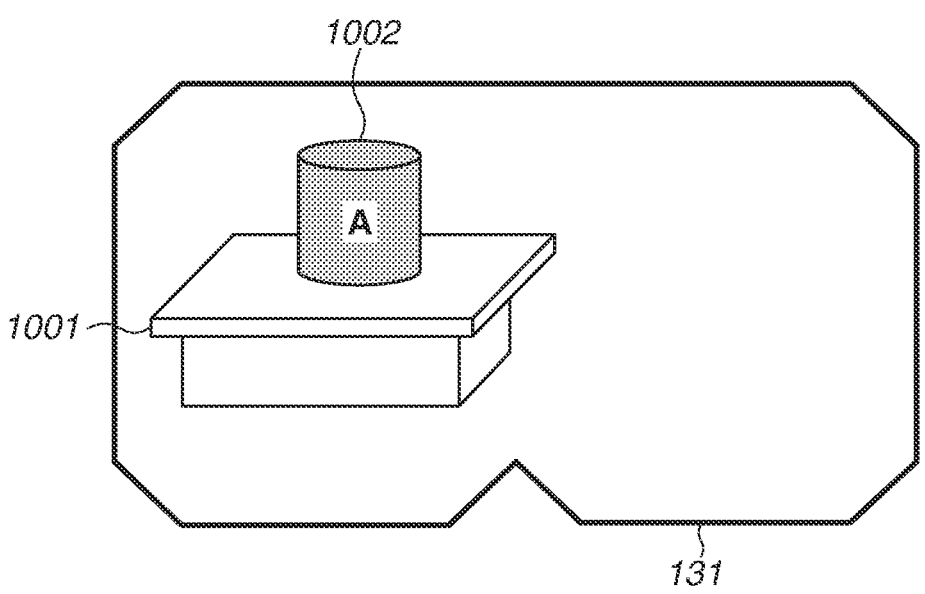
FIGS. 10A to 10D are diagrams each illustrating an example of a screen displayed on the client terminal according to the first exemplary embodiment.
Figure 10B:
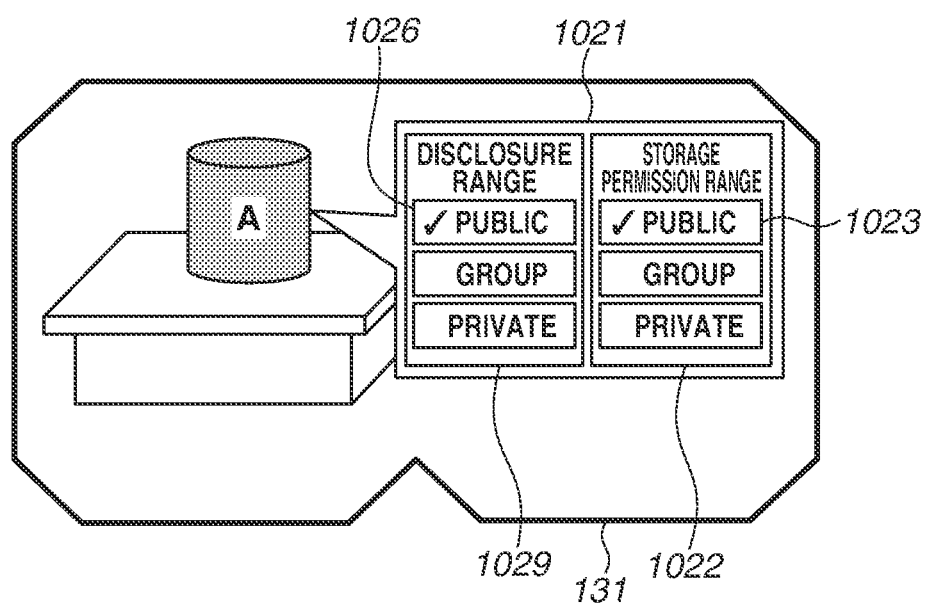
Figure 10C:
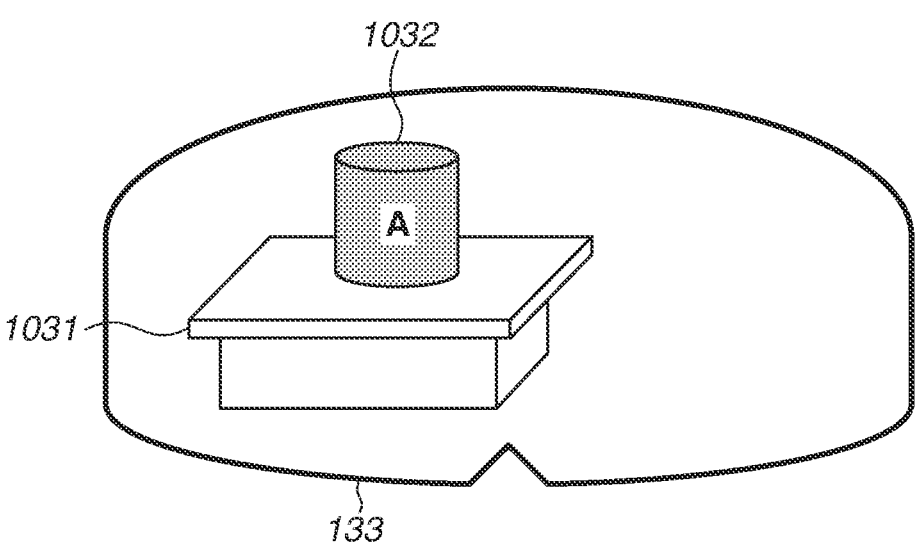
Figure 10D:
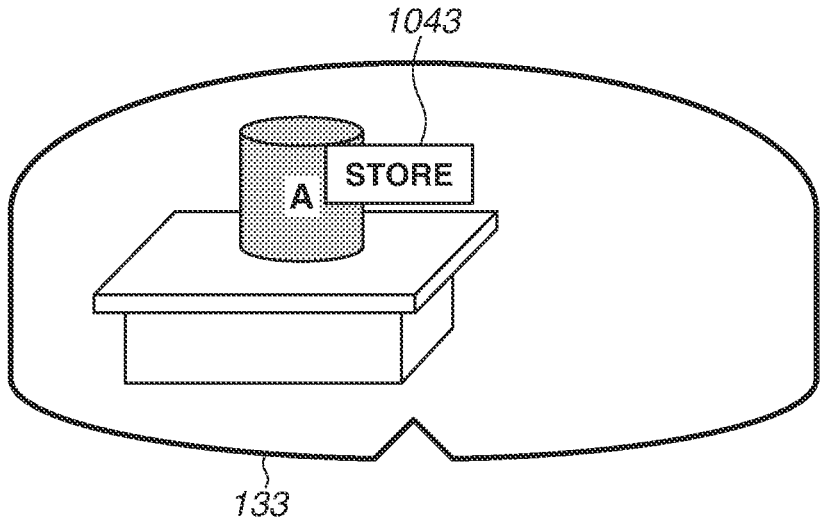

The anchor generation unit 302 performs processing for generating an anchor based on a user operation. The user selects a 3D model stored in the virtual object data management unit 301 via the anchor generation unit 302 and places a virtual object of the 3D model in the real world by an operation with the fingers captured by the camera 207 or an operation on the touch panel of the display 206. FIGS. 10A and 10B illustrate images displayed on the display 206 of the client terminal 131 of the HMD type. FIGS. 10C and 10D illustrate images displayed on the display 206 of the client terminal 133 of the HMD type.

The user operates a cylindrical virtual object 1002 stored in the virtual object data management unit 301 of the client terminal 131 by using the above-described method to place the cylindrical virtual object 1002 on a desk 1001 in the real world as illustrated in FIG. 10A. The anchor generation unit 302 analyzes an image of the surrounding area, where the virtual object is placed, captured via the camera 207, to extract feature quantities, and stores the feature quantities in the local anchor management unit 306 in association with the virtual object. The anchor generation unit 302 also identifies the position information on the anchor by using a GPS sensor connected via the interface 208 and then associates the position information with the anchor. The user associates the anchor and the sensor via the anchor generation unit 302. The user further sets the disclosure range and the storage permission range via the anchor generation unit 302.

FIG. 10B illustrates a state of display in which the user sets a disclosure range 1029 and a storage permission range 1022 for the anchor by operating a dialog 1021 displayed on the display 206 of the client terminal 131. Referring to FIG. 10B, the user selects Public 1026 (disclosed to all users) for the disclosure range, and selects Public 1023 (permission to all users) for the storage permission range. The anchor generation unit 302 transmits the anchor generated in this way and then stored in the local anchor management unit 306, to the anchor reception unit 312.

The anchor acquisition unit 303 issues an anchor acquisition request to the anchor provision unit 313 based on sensor information connected with the interface 208, and stores the anchor acquired from the anchor provision unit 313 in the local anchor management unit 306. For example, in a case where the anchor acquisition unit 303 detects an anchor near the present location based on a GPS signal or a Wi-Fi or Beacon signal, the anchor acquisition unit 303 issues an anchor acquisition request for the anchor associated with the Wi-Fi or Beacon signal to the anchor provision unit 313.

The anchor drawing unit 304 compares the feature quantities included in each anchor stored in the local anchor management unit 306 with the image in the real world captured by the camera 207, and places a virtual object included in the anchor at a position having matched the feature quantities.

FIG. 10C illustrates a state where the cylindrical virtual object 1002 placed on the desk 1001 on the client terminal 131 by the user, as illustrated in FIG. 10A, is projected as a cylindrical virtual object 1032 on a desk 1031 having the same feature quantity on the client terminal 133. In a case where the user operating the client terminal 133 is included in the storage permission range of the anchor of the cylindrical virtual object 1032, and when the user selects the cylindrical virtual object 1032, the anchor drawing unit 304 draws a storage dialog 1043 as illustrated in FIG. 10D. When the user selects the storage dialog 1043, the anchor drawing unit 304 stores a cylindrical virtual object as 3D model data in the virtual object data management unit 301 of the client terminal 133. As described above, the 3D model data managed by the virtual object data management unit 301 can be freely placed in the real world. On the other hand, in a case where the user operating the client terminal 133 is not included in the storage permission range of the anchor of the cylindrical virtual object 1032, even if the user selects the cylindrical virtual object 1032, the anchor drawing unit 304 does not display the storage dialog 1043.

The disclosure range and the storage permission range in Table B may be set based on a logged-in state of a user in such a manner that browsing of an anchor is permitted and storing of the anchor is not permitted to the user before logging in the system or guest users but browsing and storing of the anchor is both permitted to the user after logging in the system. Alternatively, the disclosure range and the storage permission range in Table B may be set in such a manner that an anchor can be viewed only by users following, for example, a specific users or a shop in a social network system (SNS).

As described above, the 3D model data stored in the virtual object data management unit 301 can be freely superimposed on and placed in the real world by the user. However, the virtual object associated with the anchor stored in the local anchor management unit 306 cannot be operated by the user.

A series of processing for displaying an anchor generated by the client terminal 131 on another client terminal 133 will be described below with referenced to FIGS. 4 to 7.

Figure 4:
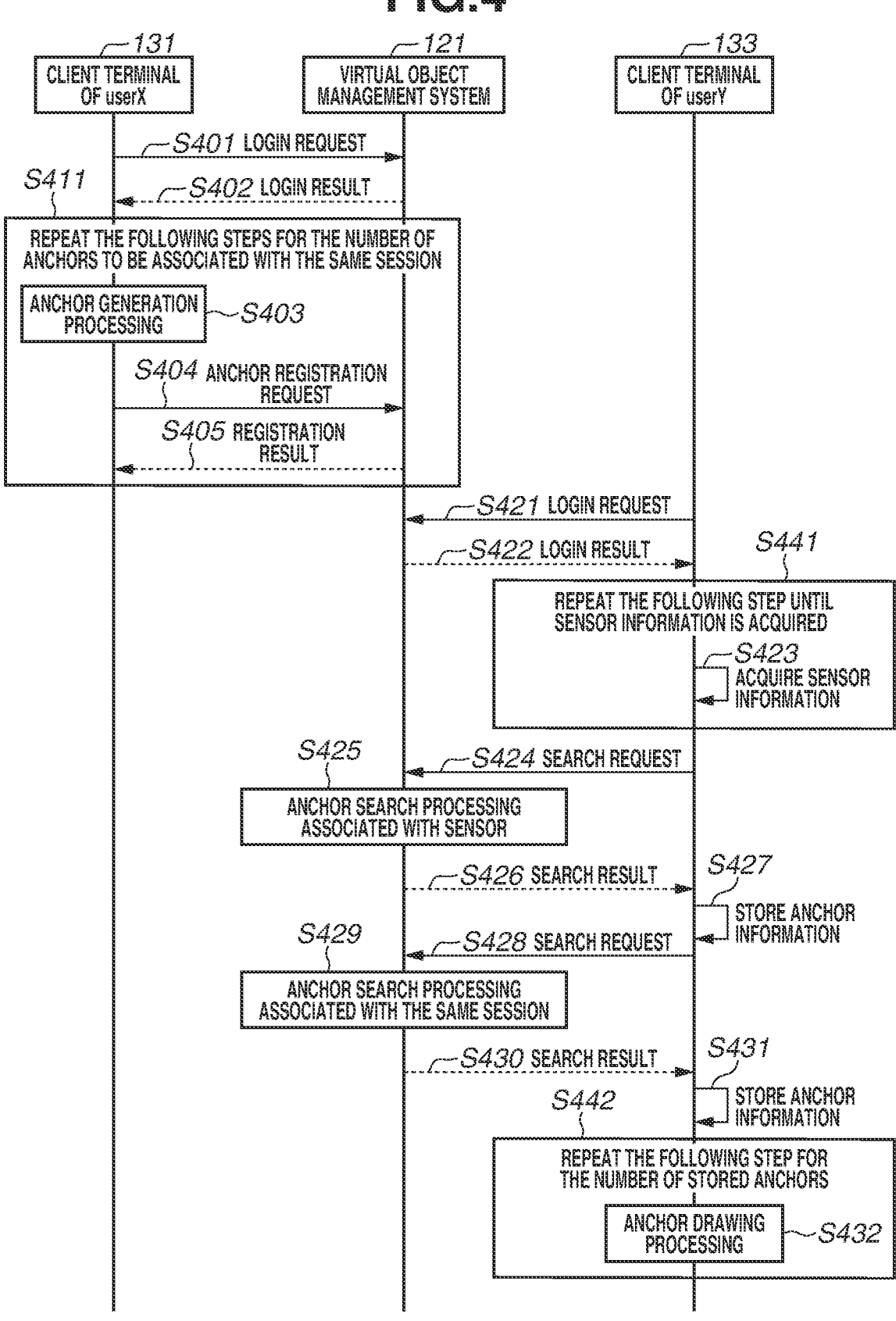
FIG. 4 is a sequence diagram illustrating processing for sharing a virtual object on a plurality of terminals according to the first exemplary embodiment.

FIG. 4 illustrates a sequence in which the user registers the anchor generated by the client terminal 131 to the virtual object management system 121 and the client terminal 133 acquires and displays the anchor stored in the virtual object management system 121. The user ID of the user operating the client terminal 131 is userX in Table A, the user ID of the user operating the client terminal 133 is userY in Table A, and the userX operates the client terminal 131 to register the anchor with an Anchor ID a in Table B.

Firstly, the sequence in steps S401 to S405 in FIG. 4 will be described below, in which the userX operates the client terminal 131 to register the anchor. In step S401, the userX operates the client terminal 131 to transmit the user ID and password to the login processing unit 315 via the login unit 305. In step S402, the login processing unit 315 determines whether the user ID and password of the userX correspond to the user ID and password managed by the user management unit 314, and, in a case where the user ID and password of the userX correspond to the user ID and password managed by the user management unit 314, the login processing unit 315 returns the login result as a successful login. In step S403, the userX places the virtual object stored in the virtual object data management unit 301 and generates an anchor via the anchor generation unit 302, and stores the anchor in the local anchor management unit 306. In step S404, the anchor generation unit 302 transmits an anchor registration request for the generated anchor to the anchor reception unit 312. Upon reception of the anchor registration request, the anchor reception unit 312 registers the received anchor to the anchor management unit 311. In step S405, the anchor reception unit 312 returns the registration result to the anchor generation unit 302. In step S411, in a case where the userX wants to register a plurality of anchors with the same session ID, userX repeats steps S403 to S405.

Figure 5:
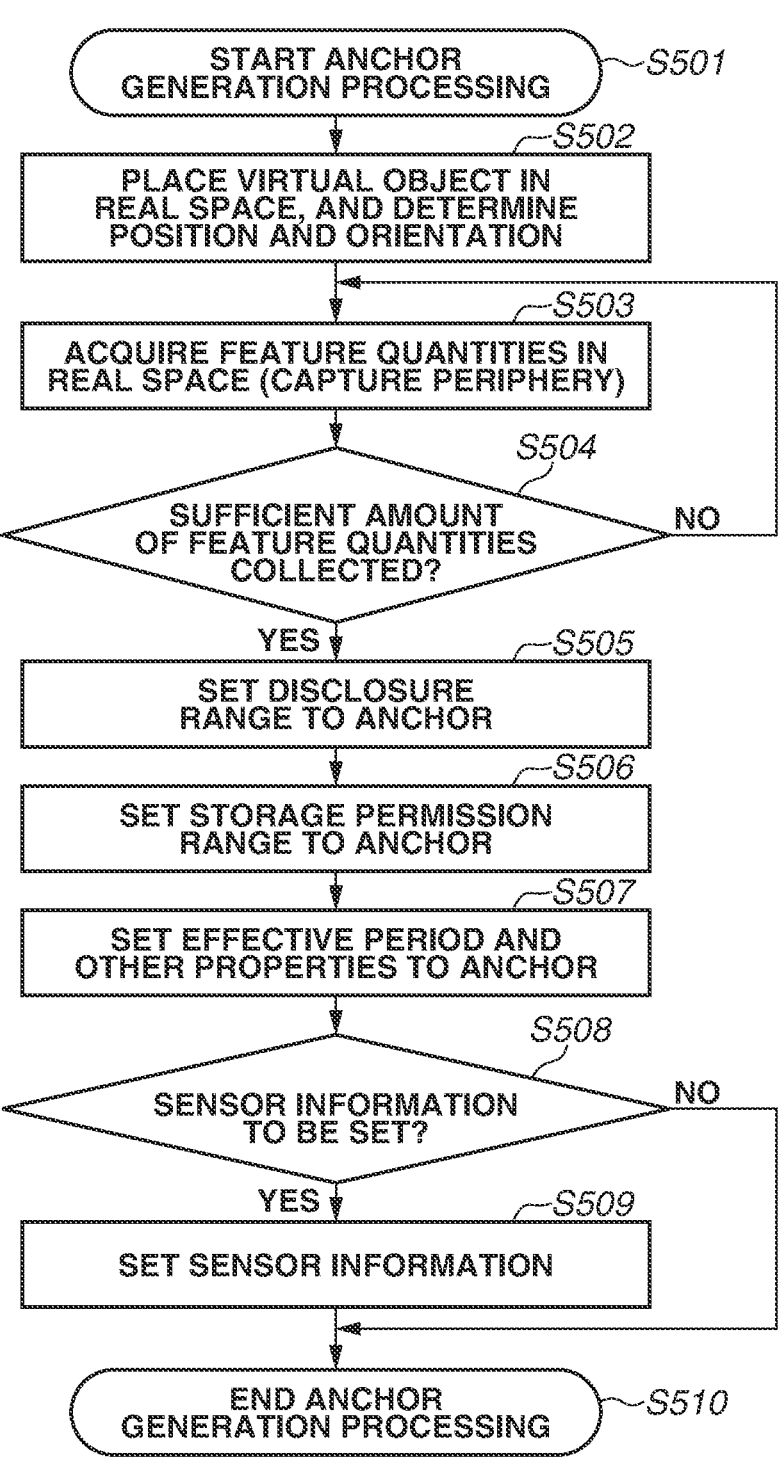
FIG. 5 is a flowchart illustrating processing for generating an anchor according to the first exemplary embodiment.

FIG. 5 is a flowchart illustrating anchor generation processing (step S403) in FIG. 4 in detail performed by the anchor generation unit 302 and started in step S501. In step S502, the anchor generation unit 302 places the virtual object in the real world space and determines the position and orientation of the virtual object in accordance with a user operation. In step S503, the anchor generation unit 302 captures an image of the surrounding area by the camera 207 to acquire three-dimensional feature quantities in the space. In a case where the anchor generation unit 302 does not determine that a sufficient amount of feature quantities have been collected (NO in step S504), the processing returns to step S503. In step S503, the anchor generation unit 302 acquires feature quantities again. On the other hand, in a case where the anchor generation unit 302 determines that a sufficient amount of feature quantities have been collected (YES in step S504), the anchor generation unit 302 displays a dialog as illustrated in FIG. 10B on the display 206. In steps S505 and S506, the userX sets the disclosure range and the storage permission range. For example, the userX sets the disclosure range to be public (disclosed to all users) and sets the storage permission range to be public (permission to all users), as illustrated in FIG. 10B. In step S507, the anchor generation unit 302 allows the userX to set the effective period and other required properties to the anchor. In a case where the sensor information is not to be set to the anchor (NO in step S508), the processing proceeds to step S510 and exits the flowchart. On the other hand, in a case where the sensor information is to be set to the anchor (YES in step S508), then in step S509, the anchor generation unit 302 allows the user to set the sensor information. Then, the processing proceeds to step S510 and exits the flowchart. For example, in step S509, the anchor generation unit 302 associates anchor information with a Beacon ID=123 according to a user operation.

This completes the description of the sequence that the userX operates the client terminal 131 to register the anchor to the virtual object management system 121.

A sequence in steps S421 to S442 in FIG. 4 will be described below. In the sequence, the userY operates the client terminal 133 and the client terminal 133 acquires and draws an anchor.

In step S421, the userY operates the client terminal 133 to transmit the user ID and the password to the login processing unit 315 via the login unit 305. In step S422, the login processing unit 315 determines whether the user ID and the password of the userY correspond to the user ID and the password managed by the user management unit 314, and, in a case where the determination is successful, returns the login result as a successful login.

In step S423, the anchor acquisition unit 303 acquires the sensor information. In step S441, in a case where the anchor acquisition unit 303 cannot acquire the sensor information, the anchor acquisition unit 303 repeats step S423. The anchor acquisition unit 303 acquires the sensor information via a sensor for detecting a Bluetooth® signal connected to the client terminal 133 via the interface 208.

For example, in a case where the sensor detects the signal from a terminal having the Beacon ID=123, then in step S424, the anchor acquisition unit 303 transmits a search request for an anchor associated with the Beacon ID=123 to the anchor provision unit 313, together with the user ID, which is userY, as the login user. In step S425, the anchor provision unit 313 searches for an anchor associated with the Beacon ID=123 in the anchor management unit 311 and filters only anchors of which the disclosure range includes userY. In step S426, the anchor provision unit 313 returns the found anchor(s) to the anchor acquisition unit 303. In the present exemplary embodiment, two different anchors are associated with the Beacon ID=123, which are an anchor with Anchor ID=a and an anchor with Anchor ID=b. The disclosure range of the anchor with Anchor ID=b includes users belonging to Group S. Since the userY does not belong to Group S, as shown in Table A, the userY is not permitted to acquire the anchor with Anchor ID=b. On the other hand, since the disclosure range of the anchor with Anchor ID=a is public (disclosed to all users), the userY is permitted to acquire the anchor with Anchor ID=a.

In step S427, the anchor acquisition unit 303 stores the anchor returned from the anchor provision unit 313 in the local anchor management unit 306. In step S428, the anchor acquisition unit 303 issues a search request for anchors having the same session ID to the anchor provision unit 313.

More specifically, in step S428, the anchor acquisition unit 303 issues a search request for anchors having the same Session ID=111 as that of the anchor with Anchor ID=a to the anchor provision unit 313. In step S429, the anchor provision unit 313 searches for anchors with Session ID=111 in the anchor management unit 311 and filters only anchors of which the disclosure range includes userY. In step S430, the anchor provision unit 313 returns the found anchor(s) to the anchor acquisition unit 303. More specifically, another anchor with Session ID=111 is the anchor with Anchor ID=d of which the disclosure range is public (disclosed to all users), and in step S430, the anchor provision unit 313 returns the anchor with Anchor ID=d to the anchor acquisition unit 303.

In step S431, the anchor acquisition unit 303 stores the anchor returned from the anchor provision unit 313 in the local anchor management unit 306. Finally, in step S442, the anchor drawing unit 304 repeats anchor drawing processing (step S432) for the number of anchors stored in the local anchor management unit 306.

Detailed processing of the anchor search processing associated with the sensor in step S425 and the anchor search processing associated with the same session in step S429 that are performed by the anchor provision unit 313 will be described below with reference to the flowcharts in FIGS. 6A to 6C.

FIG. 6A is a flowchart illustrating the anchor search processing associated with the sensor in step S425 that is performed by the anchor provision unit 313.

In step S602, the anchor provision unit 313 checks whether any other anchor associated with the sensor included in the anchor acquisition request from the anchor acquisition unit 303 exist in Table A managed by the anchor management unit 311. In a case where such an anchor does not exist (NO in step S602), the processing proceeds to step S605. In step S605, the anchor provision unit 313 ends the processing. On the other hand, in a case where such an anchor exists (YES in step S602), then in step S603, the anchor provision unit 313 acquires the corresponding anchor as a response to the request from the anchor management unit 311. In step S604, the anchor provision unit 313 performs viewing permission check processing (described below). Then, the processing returns to step S602.

FIG. 6B is a flowchart illustrating the anchor search processing associated with the same session (step S429) performed by the anchor provision unit 313.

In step S612, the anchor provision unit 313 checks whether any other anchor associated with the session ID included in the anchor acquisition request from the anchor acquisition unit 303 exists in Table A managed by the anchor management unit 311. In a case where such an anchor does not exist (NO in step S612), the processing proceeds to step S615. In step S615, the anchor provision unit 313 ends the processing. On the other hand, in a case where such an anchor exists (YES in step S612), then in step S613, the anchor provision unit 313 acquires the corresponding anchor from the anchor management unit 311. In step S614, the anchor provision unit 313 performs viewing permission check processing (described below). Then, the processing returns to step S612.

FIG. 6C is a flowchart illustrating the viewing permission check processing commonly performed in steps S604 and S614 in the flowcharts in FIGS. 6A and 6B, respectively.

In step S622, the anchor provision unit 313 determines whether the user who issued the anchor acquisition request is included in the disclosure range of the found anchor. In a case where the user is included in the disclosure range of the found anchor (YES in step S622), then in step S623, the anchor provision unit 313 stores the acquired anchor in an anchor list. On the other hand, in a case where the user is not included in the disclosure range of the found anchor (NO in step S622), the processing proceeds to step S624. In step S624, the anchor provision unit 313 ends the viewing permission check processing in step S604 or S614. In both the anchor search processing associated with the sensor in step S425 and the anchor search processing associated with the same session in step S429, the anchor provision unit 313 returns only the anchor stored in the anchor list in step S623 to the anchor acquisition unit 303.

Figure 7:
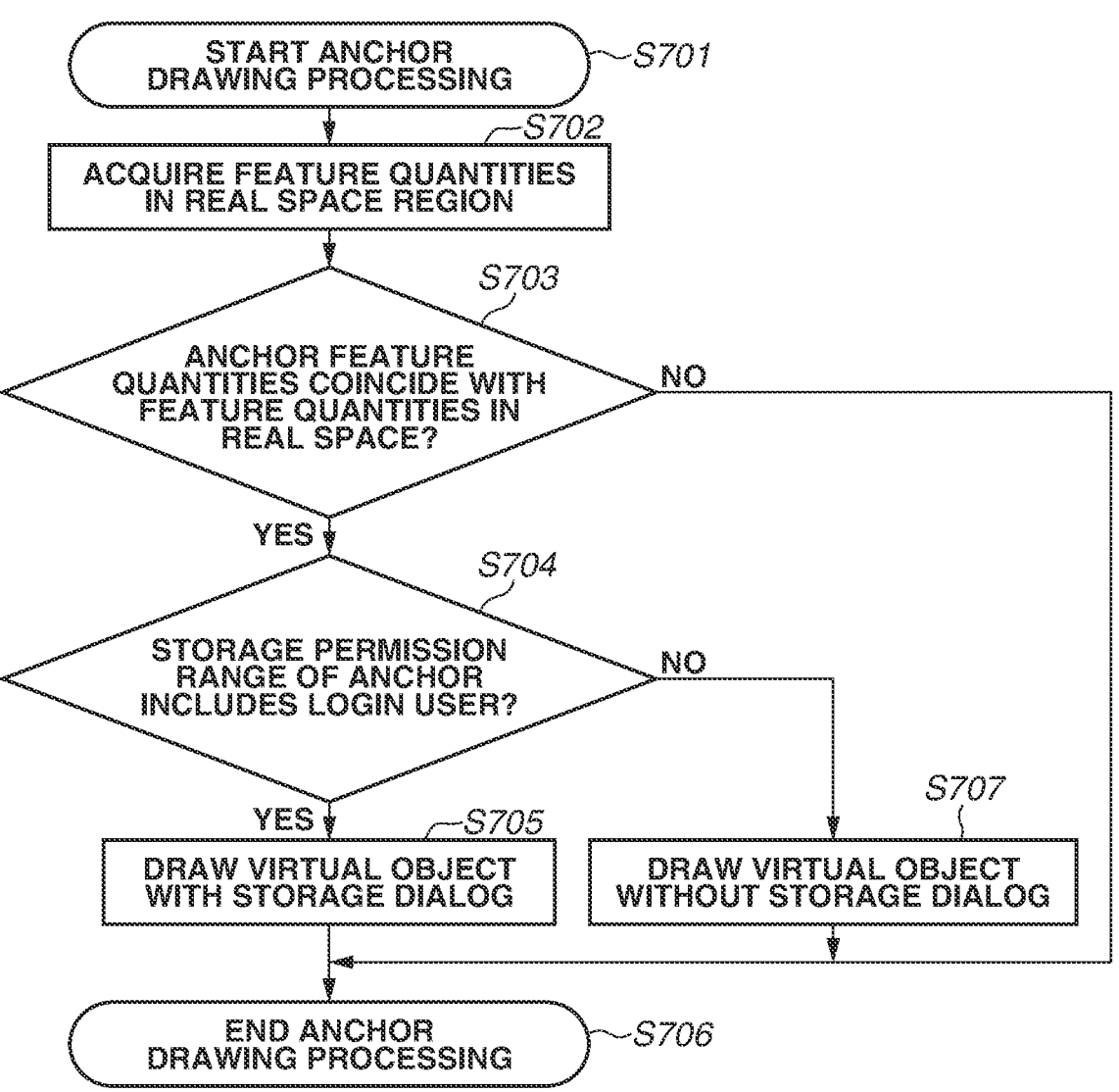
FIG. 7 is a flowchart illustrating processing for drawing a virtual object performed by the client terminal according to the first exemplary embodiment.

FIG. 7 is a flowchart illustrating the anchor drawing processing in step S432 that is performed by the anchor drawing unit 304.

In step S702, the anchor drawing unit 304 acquires feature quantities in a real space region from an image captured by the camera 207. In step S703, the anchor drawing unit 304 determines whether the acquired feature quantities coincide with the anchor feature quantities. In a case where the acquired feature quantities do not coincide with the anchor feature quantities (NO in step S703), the processing proceeds to step S706. In step S706, the anchor drawing unit 304 ends the anchor drawing processing in step S432.

On the other hand, in a case where the acquired feature quantities coincide with the anchor feature quantities (YES in step S703), then in step S704, the anchor drawing unit 304 checks whether the storage permission range of the anchor includes the login user. In a case where the storage permission range of the anchor includes the login user (YES in step S704), then in step S705, the anchor drawing unit 304 draws the virtual object on the display 206 in association with the storage dialog 1043. On the other hand, In a case where the storage permission range of the anchor does not include the login user (NO in step S704), then in step S707, the anchor drawing unit 304 draws the virtual object on the display 206 not in association with the storage dialog 1043.

In a case where the anchor drawing unit 304 draws the virtual object in association with the storage dialog 1043 in step S705, the storage dialog 1043 for the virtual object appears as illustrated in FIG. 10D in response to a user's selection of the virtual object displayed on the display 206. On the other hand, in a case where the anchor drawing unit 304 draws the virtual object not in association with the storage dialog 1043 in step S707, the storage dialog 1043 for the virtual object does not appear even when the user selects the virtual object displayed on the display 206.

As an example of a usage of a virtual object specific to XR, the user copies the virtual object associated with the real world and then places the virtual object in another location (another anchor). In this case of usage, the user who places the virtual object may want to set the storage permission range to limit users permitted to store a copy of the virtual object, similar to the disclosure range.

Examples of virtual objects with which users permitted for storage are limited to prevent the virtual objects from being placed in other locations include a virtual object including coupon information placed in front of an actual shop as a benefit for coming to the actual shop and a virtual object intended to simply prohibit secondary reprinting in terms of copyright.

Since, in the present exemplary embodiment, not only the disclosure range for viewing a virtual object but also the storage permission range are managed in association with an anchor, it is possible to support the above-described examples of operations.

According to the above-described method, the user who has registered an anchor can disclose a virtual object only to intended users and permit only the intended users to store the virtual object.

In implementation of the first exemplary embodiment, a user may possibly want to perform the following control in a certain case. If an anchor having a condition setting for the disclosure range and the storage permission range is neither displayed nor stored (for example, only users belonging to a certain group and users following a shop are permitted to display and store a virtual object), the condition is displayed to users to guide them to display and store the anchor. An Example of such a case is that a shop manager wants to keep customers by displaying a discount coupon only to users following the shop or by allowing only users of a group using products of a certain genre to store new products of the genre.

In the method according to first exemplary embodiment, the disclosure range and the storage permission range can be set but it may be not sufficient in a case in which the number of users permitted to display and store an anchor is wanted to be increased by guiding users to display and store the anchor. The method according to the first embodiment is inconvenient for the shop manager who needs the above-described usage.

In a second exemplary embodiment, in a case where the user is not permitted to display an anchor based on the setting for the disclosure range and the storage permission range since the condition is not satisfied, a notification is issued to the user. In a case where the user is not permitted to store an anchor, a registration dialog 1113 is displayed instead of the storage dialog 1043 on the display 206.

Since some processes of the present exemplary embodiment are duplicated with the processes of the first exemplary embodiment, only differences from the first exemplary embodiment will be described below and the redundant descriptions are omitted.

Table C illustrates data items managed by the anchor management unit 311 according to the present exemplary embodiment.

TABLE C

| Anchor ID | Dis- closure . . . range | Storage Permission Range | Notification Message | URL |
|---|---|---|---|---|
| A | . . . Public | Public | | |
| B | . . . Group S | Group S | Information about product B is displayed after joining in Group S. | https://xxx.com? group=S |
| C | . . . Group S | Private | | |
| D | . . . Public | Group T | | https://xxx.com? group=T |
| : | : | : | | |

In Table C, definitions of columns other than the "Notification Message" and "URL" columns are the same as definitions of the corresponding columns in Table B. In Table C, the "Session ID", "Virtual Object Data", "Feature Quantity", "Position Information", "Sensor Information", and "Owner" columns are omitted. The "Notification Message" column stores character strings each of which is to be notified to the user when a corresponding anchor is not displayed. The "URL" column stores uniform resource locators (URL) in each of which a corresponding procedure to be required to display and store an anchor is performed.

Figure 11A:
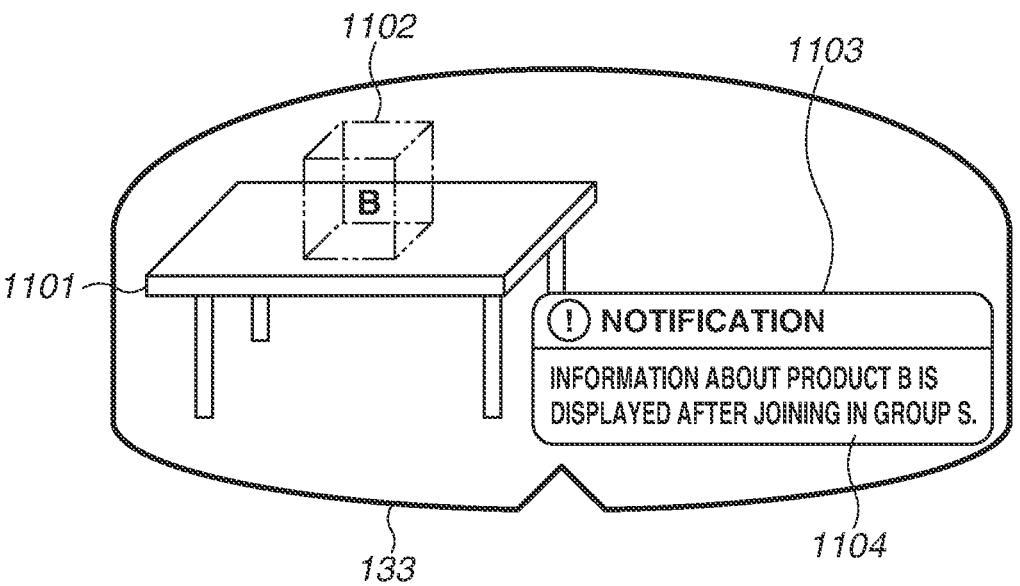
FIGS. 11A and 11B are diagrams each illustrating an example of a screen displayed on a client terminal according to the second exemplary embodiment.
Figure 11B:
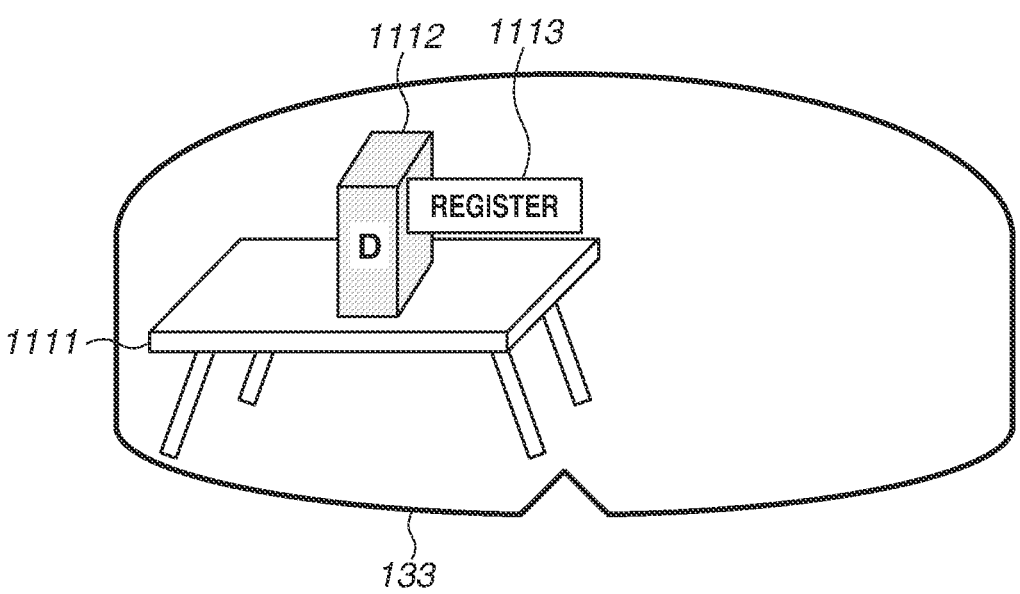

FIGS. 11A and 11B illustrate images on the display 206 of the client terminals 131 to 133 according to the present exemplary embodiment.

Referring to FIG. 11A, in a case where a user not belonging to Group S tries to display an anchor B, the anchor B cannot be displayed because the user does not belong to the Group S. In this case, a cube virtual object 1102 placed on a desk 1101 is not displayed on the display 206 and thus is not visible to the user.

In the present exemplary embodiment, in a case where an undisplayed virtual object can be displayed, similar to the case of the cylindrical virtual object 1032 in FIG. 11A, if a specific condition is satisfied, the anchor drawing unit 304 generates a notification area 1103 to notify the user of a character string 1104 in the "Notification Message" column.

In response to the user selecting the notification area 1103, display transition is performed to the URL stored in the "URL" column.

The notification area 1103 may be generated in the vicinity of the position where the cube virtual object 1102 is placed or generated in a standard area of the client terminals 131 to 133.

While, in the present exemplary embodiment, the notification method is a message projected on the display 206 of the client terminals 131 to 133 as illustrated in FIG. 11A, the user may be notified of the message in an audible way or in other forms. In a case where the "Notification Message" column is a blank, the user is notified of no message even when an anchor is not displayed.

For example, an anchor C is not displayed to a user not belonging to Group S, similar to the case of the anchor B. In this case, since the "Notification Message" column is a blank, the anchor drawing unit 304 does not generate the notification area 1103 even if the user who tries to display the anchor C does not belong to Group S.

In a case where a user not belonging to Group T tries to store an anchor D, and the user cannot store the anchor D because the user does not belong to Group T, the anchor drawing unit 304 draws a virtual object 1112 of the anchor D placed on a desk 1111 with a Registration dialog 1113. More specifically, in a case where a user not belonging to Group T selects the virtual object 1112 of the anchor D, the Registration dialog 1113 is generated as illustrated in FIG. 11B. In response to the user selecting the Registration dialog 1113 in FIG. 11B, display transition is performed to the URL stored in the "URL" column.

Figure 8:
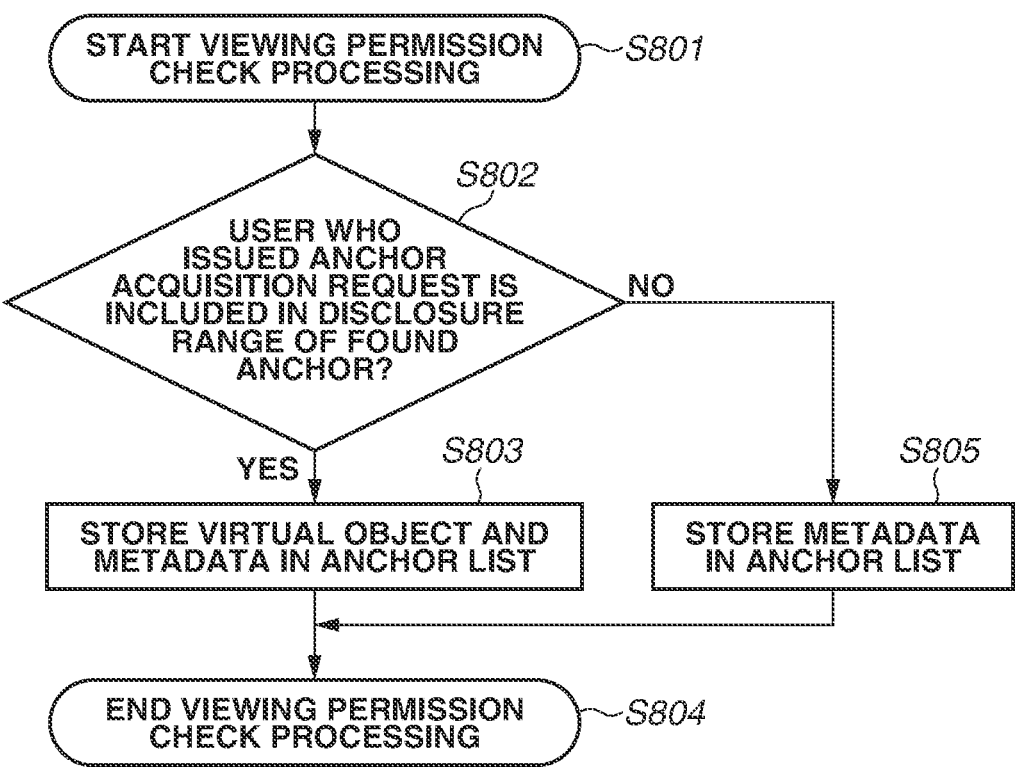
FIG. 8 is a flowchart illustrating viewing permission check processing that is performed by the virtual object managing system according to a second exemplary embodiment.

FIG. 8 is a flowchart illustrating the viewing permission check processing according to the present exemplary embodiment, i.e., a flowchart corresponding to the processing in FIG. 6C according to the first exemplary embodiment.

In step S802, the anchor provision unit 313 checks whether the user who issued the anchor acquisition request is included in the disclosure range of the found anchor. In a case where the user is included in the disclosure range (YES in step S802), then in step S803, the anchor provision unit 313 stores the virtual object and meta data in the anchor list, similar to the first exemplary embodiment. On the other hand, in a case where the user is not included in the disclosure range (NO in step S802), then in step S805, the anchor provision unit 313 stores only the meta data in the anchor list. The meta data in this case refers to all pieces of information except the information that is stored in the "Virtual Object Data" column in Table C. More specifically, the present exemplary embodiment differs from the first exemplary embodiment in that the anchor provision unit 313 returns the meta data to the anchor acquisition unit 303 even for anchors of which the disclosure range does not include the user.

Figure 9:
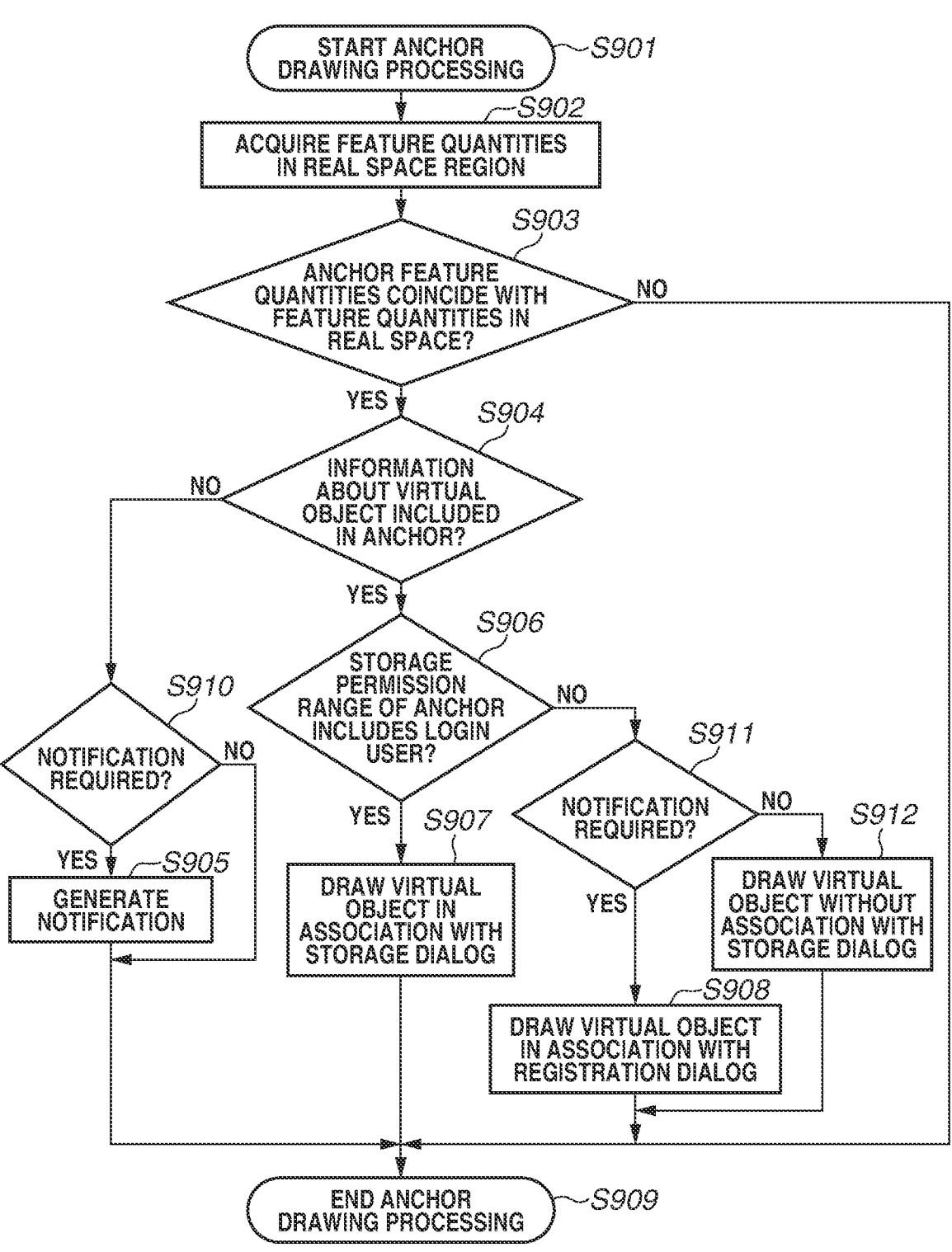
FIG. 9 is a flowchart illustrating virtual object drawing processing that is performed by a client terminal according to the second exemplary embodiment.

FIG. 9 is a flowchart illustrating the anchor drawing processing in step S432 performed by the anchor drawing unit 304 according to the present exemplary embodiment.

In step S902, the anchor drawing unit 304 acquires feature quantities in the real space region from the image captured via the camera 207. In step S903, the anchor drawing unit 304 checks whether the acquired feature quantities coincide with the anchor feature quantities. In a case where the acquired feature quantities do not coincide with the anchor feature quantities (NO in step S903), the processing proceeds to step S909. In step S909, the anchor drawing unit 304 ends the anchor drawing processing in step S432. On the other hand, in a case where the acquired feature quantities coincide with the anchor feature quantities (YES in step S903), then in step S904, the anchor drawing unit 304 checks whether the anchor includes information about a virtual object.

In a case where the anchor does not include information about a virtual object (NO in step S904), which means that the user does not have the viewing permission, then in step S910, the anchor drawing unit 304 determines whether it is necessary to notify the user that the user does not have the viewing permission.

More specifically, in step S910, the anchor drawing unit 304 determines whether a value for the anchor is set in the "Notification Message" column in Table C. In a case where a value is set (YES in step S910), then in step S905, the anchor drawing unit 304 generates the notification area 1103 illustrated in FIG. 11A as described above. Then, the processing exits the flowchart.

On the other hand, in a case where no value for the anchor is set in the "Notification Message" column in Table C (NO in step S910), the anchor drawing unit 304 ends the processing. In a case where the anchor includes information about a virtual object (YES in step S904), which means that the user has the viewing permission, then in step S906, the anchor drawing unit 304 checks whether the storage permission range of the anchor includes the login user. In a case where the storage permission range of the anchor includes the login user (YES in step S906), then in step S907, the anchor drawing unit 304 draws a virtual object of the anchor on the display 206 in association with the storage dialog 1043.

On the other hand, in a case where the storage permission range of the anchor does not include the login user (NO in step S906), then in step S911, the anchor drawing unit 304 checks whether it is necessary to notify the user that the user does not have the storage permission.

More specifically, in step S911, the anchor drawing unit 304 checks whether a value for the anchor is set in the "URL" column in Table C. In a case where a value is set (YES in step S911), then in step S908, the anchor drawing unit 304 draws a virtual object of the anchor on the display 206 in association with the registration dialog 1113, as illustrated in FIG. 11B.

On the other hand, in a case where no value is set in the "URL" column in Table C (NO in step S911), then in step S912, the anchor drawing unit 304 draws a virtual object of the anchor on the display 206 in association with neither the storage dialog 1043 nor the registration dialog 1113. In a case where the anchor drawing unit 304 draws the virtual object in association with the storage dialog 1043 in step S907 and then the user selects the virtual object displayed on the display 206, the storage dialog 1043 for the virtual object appears, as illustrated in FIG. 10D. In a case where the anchor drawing unit 304 draws the virtual object in association with the Registration dialog 1113 in step S908 and then the user selects the virtual object displayed on the display 206, the registration dialog 1113 for the virtual object appears, as illustrated in FIG. 10B. In a case where the anchor drawing unit 304 draws the virtual object in association with neither the storage dialog 1043 nor the registration dialog 1113 in step S912, no dialog appears even when the user selects the virtual object displayed on the display 206.

In the present exemplary embodiments, a timing of notifying the user is the timing when the anchor feature quantities coincide with the feature quantities in the real world in step S903. However, the timing of notifying the user may be, for example, the timing when the user looks at the direction in which the cube virtual object 1102 is to be placed or the timing when the user comes close to the position where the cube virtual object 1102 is to be placed.

According to the present exemplary embodiments, the condition to be set in the "Disclosure Range" column and "Storage Permission Range" column in Table C is based on whether the user belongs to a group in the "Belonging Groups" column in Table A according to the first exemplary embodiment. Alternatively, in a case of cooperating with an existing SNS, for example, whether the user registers to the existing SNS, whether the user participates in a specific group, and whether the user follows a specific user can be used for the setting. In such a case, a URL of a registration page of the existing SNS, a URL of an ID cooperation page, a URL of an entry page to a specific group, and a URL of a page of a specific user are stored in the "URL" column in Table C. The description of a method of cooperation with an existing SNS will be omitted.

According to the present exemplary embodiment, the disclosure range and storage permission range are set and users are guided to display and store an anchor. This enables such control as to gradually increase the number of users permitted to display and store an anchor while narrowing down the users.

The present invention also includes an apparatus, a system, or a method configured by suitably combining the above-described exemplary embodiments.

The present invention is an apparatus or a system as an entity for executing at least one piece of software (program) for implementing the functions of the above-described exemplary embodiments. A method for implementing the above-described exemplary embodiments executed by the apparatus or the system is also an aspect of the present invention. The program is supplied to the system or the apparatus via a network or various types of storage media, and at least one computer (CPU or micro processing unit (MPU)) of the system or the apparatus reads the program in at least one memory and executes the program. More specifically, as an aspect of the present invention, the present invention also includes the program itself and various types of computer-readable storage media storing the program. The present invention can also be achieved by using a circuit (for example, an application specific integrated circuit (ASIC)) for implementing the functions of the above-described exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a mechanism in which, when a virtual object is disclosed in association with feature quantities in the real world, a permission to be set is reflected to the virtual object such that, for example, the intention of a user disclosing the virtual object is reflected is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-034047, filed Mar. 7, 2022, which is hereby incorporated by reference herein in its entirety.

What is claimed is:

1. A system for managing a virtual object, the system comprising:

a management unit configured to manage anchor information, wherein the anchor information includes identification information of the anchor information, feature quantities in a real world, a permission setting and message information, wherein the permission setting includes a setting for determination of a range of users to whom a virtual object associated with the identification information is to be disclosed, and wherein the system further comprises a terminal configured to project one or more virtual objects to the real world, wherein in a case where a user attempts to perform an operation on the virtual object associated with the identification information via the terminal and the user belongs to the range of users based on the permission setting, the terminal projects, so that the user can perform the operation on the virtual object via the terminal, the virtual object to the real world based on the feature quantities associated with the identification information, and wherein in a case where a user attempts to perform an operation on the virtual object associated with the identification information via the terminal and the user does not belong to the range of users based on the permission setting, the terminal, instead of projecting the virtual object, projects a notification to the real world based on the message information and the feature quantities associated with the identification information.

2. The system according to claim 1, wherein the permission setting includes a permission setting which permits an operation to store a copy of the virtual object via the terminal projecting the virtual object.

3. The system according to claim 1, wherein the permission setting includes a permission setting which permits an operation to store a copy of the virtual object is settable by using user information.

4. The system according to claim 1, wherein the a terminal configured to set the permission setting for the virtual object associated with the identification information.

5. The system according to claim 1, wherein, in response to a request using at least one of the identification information and the feature quantities in the real world from the terminal, the system returns the virtual object that is managed based on the at least one of the identification information and the feature quantities by the management unit, and wherein the terminal projects the returned virtual object is to the real world based on the permission setting.

6. The system according to claim 1, wherein the terminal includes a head-mounted display.

7. The system according to claim 1, wherein the range of users is determined by a disclosure range, the disclosure range includes public, private, and group information.

8. The system according to claim 1, wherein the projected notification is notified to guide a specific condition under which the user can operate the virtual object.

9. A method in a system for managing a virtual object, the method comprising:

managing anchor information, wherein the anchor information includes identification information of the anchor information, feature quantities in a real world, a permission setting and message information, wherein the permission setting includes a setting for determination of a range of users to whom a virtual object associated with the identification information is to be disclosed, and wherein in a case where a user attempts to perform an operation on the virtual object associated with the identification information via the terminal and the user belongs to the range of users based on the permission setting, the terminal projects, so that the user can perform the operation on the virtual object via the terminal, the virtual object to the real world based on the feature quantities associated with the identification information, and wherein in a case where a user attempts to perform an operation on the virtual object associated with the identification information via the terminal and the user does not belong to the range of users based on the permission setting, the terminal, instead of projecting the virtual object, projects, a notification to the real world based on the message information and the feature quantities associated with the identification information.

10. A non-transitory computer-readable storage medium storing a program for causing a computer to execute instructions for managing a virtual object, the method comprising:

managing anchor information, wherein the anchor information includes identification information of the anchor information, feature quantities in a real world, a permission setting and message information, wherein the permission setting includes a setting for determination of a range of users to whom a virtual object associated with the identification information is to be disclosed, and wherein the system further comprises a terminal configured to project one or more virtual objects to the real world, wherein in a case where a user attempts to perform an operation on the virtual object associated with the identification information via the terminal and the user belongs to the range of users based on the permission setting, the terminal projects, so that the user can perform the operation on the virtual object via the terminal, the virtual object to the real world based on the feature quantities associated with the identification information, and wherein in a case where a user attempts to perform an operation on the virtual object associated with the identification information via the terminal and the user does not belong to the range of users based on the permission setting, the terminal, instead of projecting the virtual object, projects a notification to the real world based on the message information and the feature quantities associated with the identification information.

* * * * *